(12) United States Patent
Takazawa et al.

(10) Patent No.: US 11,088,408 B2
(45) Date of Patent: Aug. 10, 2021

(54) BATTERY TEMPERATURE RAISING DEVICE

(71) Applicant: Honda Motor Co., Ltd., Tokyo (JP)

(72) Inventors: Masanobu Takazawa, Saitama (JP); Hajime Uto, Saitama (JP); Naoaki Takeda, Saitama (JP); Masayuki Toyokawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 62 days.

(21) Appl. No.: 16/785,650

(22) Filed: Feb. 10, 2020

(65) Prior Publication Data
US 2020/0274209 A1     Aug. 27, 2020

(30) Foreign Application Priority Data

Feb. 25, 2019    (JP) .............................. JP2019-031871

(51) Int. Cl.
| | |
|---|---|
| *H01M 10/615* | (2014.01) |
| *H01M 10/625* | (2014.01) |
| *H01M 10/63* | (2014.01) |
| *H01M 10/42* | (2006.01) |
| *H01M 10/6568* | (2014.01) |

(52) U.S. Cl.
CPC ....... *H01M 10/615* (2015.04); *H01M 10/425* (2013.01); *H01M 10/625* (2015.04); *H01M 10/63* (2015.04); *H01M 10/6568* (2015.04); *H01M 2010/4271* (2013.01)

(58) Field of Classification Search
None
See application file for complete search history.

(56) References Cited

FOREIGN PATENT DOCUMENTS

JP          2009224256       10/2009

*Primary Examiner* — Sarah A. Slifka
(74) *Attorney, Agent, or Firm* — JCIPRNET

(57) ABSTRACT

A battery temperature raising device is provided which raises, in a vehicle having an internal combustion engine and a motor using a chargeable battery as a power source, the temperature of the battery during charging in a state that the internal combustion engine is stopped. The battery temperature raising device includes a main circuit where cooling water circulates through the internal combustion engine; a first battery circuit connected in parallel to the main circuit; and a second flow rate control valve arranged in the first battery circuit. A first temperature raising control for raising the temperature of the battery is executed, when a battery temperature is equal to or below a predetermined temperature and an engine water temperature is higher than the battery temperature during charging the battery, by opening the second flow rate control valve and introducing the cooling water inside the main circuit into the first battery circuit.

8 Claims, 6 Drawing Sheets

BATTERY TEMPERATURE RAISING DEVICE

CROSS REFERENCE TO RELATED APPLICATIONS

This application claims the priority benefit of Japanese Patent Application No. 2019-031871, filed on Feb. 25, 2019. The entirety of the above-mentioned patent application is hereby incorporated by reference herein and made a part of this specification.

BACKGROUND

Technical Field

The disclosure relates to a battery temperature raising device which raises the temperature of a battery which is a power source of a motor equipped in a vehicle together with an internal combustion engine, and particularly relates to a battery temperature raising device which performs temperature raising during charging of a battery.

Related Art

It is known that the battery used for a hybrid vehicle, an electric vehicle, or the like has a reduced performance in a low temperature state. For example, if charging is performed in a low temperature state, charging efficiency is decreased. Accordingly, charging time is increased and charging amount is decreased, and as a result, reduction of a travelling distance determined by the motor or deterioration of electric power consumption is caused. Therefore, conventionally, a battery temperature raising device for raising the temperature of the battery during charging is known and is recited in, for example, patent literature 1 (Japanese Patent Application Laid-Open No. 2009-224256).

The battery temperature raising device is applied to a plug-in type hybrid vehicle equipped with a motor and an engine and includes a first cooling water circuit in which cooling water for cooling the engine circulates due to operation of a first pump that is electric, and a second cooling water circuit which is connected in parallel to the first cooling water circuit via a first switching valve. In the second cooling water circuit, a second pump that is electric, an electric heater which heats the cooling water, and a heater core which heats air for heating of the vehicle by exchanging heat with the cooling water are arranged in order from an upstream side. In addition, a battery warm-up circuit is connected in parallel to a downstream side of the heater core in the second cooling water circuit via a second switching valve, and the battery warm-up circuit is passed through the battery.

In the battery temperature raising device, when the battery is charged by an external power source in a state that the engine is stopped, the following control is performed to raise the temperature of the battery when a detected battery temperature is equal to or less than a predetermined temperature. That is, by controlling the first and second switching valves, the first cooling water circuit, the second cooling water circuit and the battery warm-up circuit are connected to one another, the electric heater of the second cooling water circuit is actuated, and operation of the first and second pumps is started. Accordingly, the cooling water heated by the electric heater flows into the battery warm-up circuit from the second cooling water circuit and flows through the battery, and thereby the temperature of the battery is raised (warmed up).

As described above, in the conventional battery temperature raising device, the temperature of the battery is raised by driving the electric heater and heating the cooling water when the battery temperature is equal to or less than the predetermined temperature during the charging of the battery. That is, as long as the battery temperature is equal to or less than the predetermined temperature, the electric heater is driven regardless of temperature status or the like of other devices, and thus electric power is consumed excessively, resulting in a deterioration in electric power consumption.

SUMMARY

The disclosure provides a battery temperature raising device which efficiently raises the temperature of a battery in charging while utilizing heat of devices other than an electric heater as much as possible and can improve electric power consumption.

An embodiment of the disclosure provides a battery temperature raising device which raises, in a vehicle which is equipped with an internal combustion engine and a motor using a chargeable battery as a power source, a temperature of the battery during charging the chargeable battery in a state that the internal combustion engine is stopped. The battery temperature raising device includes a cooling water circuit in which cooling water circulates through the internal combustion engine due to operations of a water pump; a first battery circuit which is connected in parallel to the cooling water circuit and in which the cooling water flows through the chargeable battery; a first switching unit which is switched between a connection position for connecting the cooling water circuit and the first battery circuit to each other and a blocking position for blocking the cooling water circuit and the first battery circuit; a battery temperature sensor which detects a temperature of the chargeable battery; an engine cooling water temperature sensor which detects a temperature of the cooling water of the internal combustion engine as an engine cooling water temperature; and a temperature raising control unit which executes, when the detected battery temperature is equal to or less than a predetermined temperature and the detected engine cooling water temperature is higher than the battery temperature during charging the chargeable battery, a first temperature raising control for raising the temperature of the chargeable battery by controlling the first switching unit to the connection position and introducing the cooling water inside the cooling water circuit into the first battery circuit.

DESCRIPTION OF THE EMBODIMENTS

Figure 1:
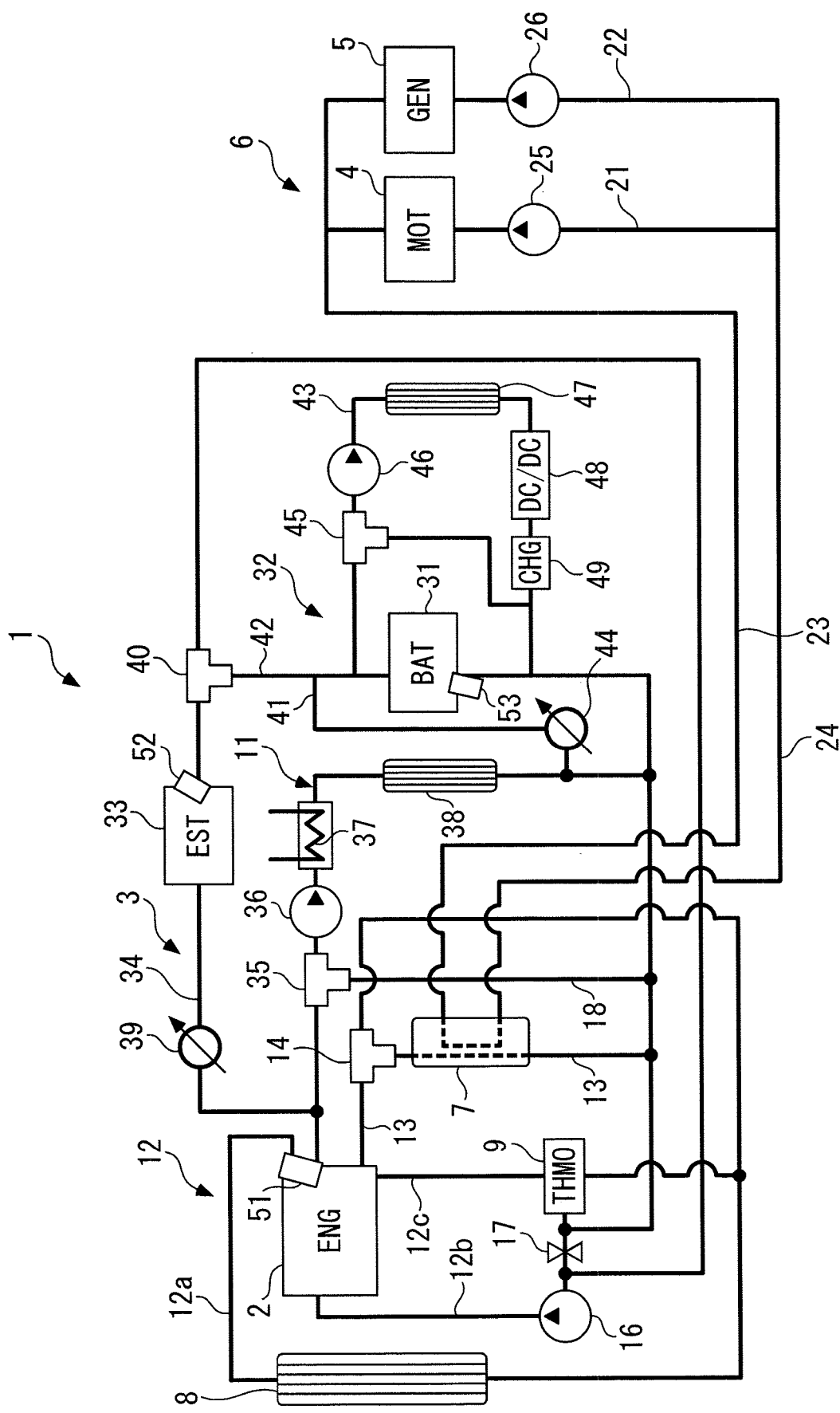
FIG. 1 is a diagram schematically showing a cooling and temperature raising device for hybrid vehicles including a battery temperature raising device according to an embodiment of the disclosure.

Exemplary embodiments of the disclosure are specifically described below with reference to the drawings. FIG. 1 schematically shows a cooling and temperature raising device for hybrid vehicle including a battery temperature raising device according to an embodiment of the disclosure.

As shown in the diagram, the hybrid vehicle (hereinafter, referred to as the "vehicle") includes an internal combustion engine 2 and a motor 4 which are power sources, a generator 5 which converts mechanical power of the vehicle into electric power and generates the electric power, a chargeable/dischargeable battery (battery for short) 31 which is a power source of the motor 4, and the like.

A cooling and temperature raising device 1 performs cooling or temperature raising on the above-described devices or the like of the vehicle according to the status (hereinafter, the "cooling or temperature raising" is appropriately referred to as "the cooling, etc."). The cooling and temperature raising device 1 includes an engine cooling circuit 3 through which cooling water (for example, LLC (Long Life Coolant)) for the cooling, etc. of the internal combustion engine (hereinafter, referred to as the "engine") 2 circulates; a MG (motor generator) cooling circuit 6 through which oil (for example, ATF (Automatic Transmission fluid)) serving as a refrigerant for the cooling, etc. of the motor 4 and the generator 5 circulates; a heat exchanger 7 for exchanging heat between the cooling water and the oil; a battery cooling circuit 32 through which cooling water for the cooling and the like of the battery 31 circulates; and the like.

The engine cooling circuit 3 includes a main circuit 11 through which the cooling water circulates constantly; a radiator circuit 12 which has a radiator 8 and circulates the cooling water between the engine 2 and the radiator 8; a heat exchanger flow path 13 which has a heat exchanger 7 and brings the cooling water flowing out from the engine 2 to the heat exchanger 7 back to the main circuit 11; a first three-way valve 14 which is arranged in the heat exchanger flow path 13 and switches flow paths of the cooling water; a heat accumulator circuit 34 which has a heat accumulator 33 and supplies high-temperature cooling water accumulated in the heat accumulator 33 to the engine 2; and the like.

One end of the main circuit 11 is connected to a cooling water outlet of a water jacket (not shown) of the engine 2, and the other end is connected to a cooling water inlet. At a downstream portion of the main circuit 11, a first water pump 16 that is electrically driven and an on-off valve 17 are arranged in order from a downstream side (a side of the engine 2). The first water pump 16 is configured to have a variable flow rate.

In addition, in the main circuit 11, a second three-way valve 35, a second water pump 36 that is electrically driven, an electric heater 37, a heater core 38 and the like are arranged in order from an upstream side. The second three-way valve 35 is configured to selectively connect the upstream portion of the main circuit 11 to the downstream portion of the main circuit 11 and a bypass flow path 18 which bypasses the main circuit 11. Similar to the first water pump 16, the second water pump 36 is configured to have a variable flow rate.

The heater core 38 heats the air for the heating of the vehicle by exchanging heat with the cooling water inside the main circuit 11. The electric heater 37 heats the cooling water when insufficient heating of the air by the heater core 38 occurs because the temperature of the cooling water is low. In addition, in the embodiment, the electric heater 37 is used to raise the temperature of the battery 31 in charging.

The radiator circuit 12 has an upstream portion 12a, a downstream portion 12b and the like. One end of the upstream portion 12a is connected to the cooling water outlet of the engine 2, the other end is connected to an upstream side of the on-off valve 17 in the main circuit 11, and the downstream portion 12b is also used as the downstream portion of the main circuit 11.

At the upstream portion 12a, the radiator 8 and a thermostat 9 are arranged in order from the upstream side. The thermostat 9 is connected to the cooling water outlet of the engine 2 via a thermo flow path 12c, and opens the radiator circuit 12 when the temperature of the cooling water is raised and reaches a predetermined temperature (for example, 90° C.). Along with this, the high-temperature cooling water flowing out from the cooling water outlet of the engine 2 sequentially flows through the upstream portion 12a of the radiator circuit 12, the radiator 8, the thermostat 9 and the downstream portion 12b, and returns to the engine 2 via the cooling water inlet, and when the high-temperature cooling water flows through the radiator 8, the heat of the cooling water is dissipated from the radiator 8 to the outside.

In the heat exchanger flow path 13, one end is connected to the first three-way valve 14 and extends through the heat exchanger 7, and the other end is connected between the heater core 38 and the on-off valve 17 in the main circuit 11. In this configuration, the cooling water flowing from the engine 2 through the first three-way valve 14 into the heat exchanger flow path 13 flows through the heat exchanger 7 into the main circuit 11.

In addition, the heat accumulator circuit 34 is connected in parallel to the main circuit 11, branches from an upstream side of the second three-way valve 35 in the main circuit 11, and joins between the first water pump 16 and the on-off valve 17 in the main circuit 11. In the heat accumulator circuit 34, a first flow rate control valve 39 for adjusting the flow rate of the cooling water, the heat accumulator 33 and a third three-way valve 40 are arranged in order from the upstream side. The heat accumulator 33 has a double structure of inside structure and outside structure, stores, in an adiabatic state, the cooling water of which the temperature is raised during the operation of the engine 2, keeps the temperature, and supplies the cooling water to the engine 2 during the warm-up operation to accelerate the warm-up. In addition, in the embodiment, the heat accumulator 33 is used to raise the temperature of the battery 31 in charging.

In addition, a MG (motor and generator) cooling circuit 6 has a motor flow path 21, a generator flow path 22, a feed flow path 23 and a return flow path 24. The motor flow path 21 is passed through the motor 4, has a motor oil pump 25, and is connected to the feed flow path 23 and the return flow path 24 at two ends. The generator flow path 22 is passed through the generator 5, has a generator oil pump 26, and is connected, in parallel with the motor flow path 21, to the feed flow path 23 and the return flow path 24 at two ends. The feed flow path 23 is connected to an oil inlet of the heat exchanger 7, and the return flow path 24 is connected to an oil outlet of the heat exchanger 7.

In the MG cooling circuit 6 with the above configuration, when the motor oil pump 25 is driven, the oil flowing out from the motor 4 flows into the heat exchanger 7 via the motor flow path 21 and the feed flow path 23, and returns to the motor oil pump 25 via the return flow path 24 and the motor flow path 21 after flowing out through the inside of the heat exchanger 7. Similarly, when the generator oil pump 26 is driven, the oil flowing out from the generator 5 flows into the heat exchanger 7 via the generator flow path 22 and the feed flow path 23, and returns to the generator oil pump 26 via the return flow path 24 and the generator flow path 22 after flowing out through the inside of the heat exchanger 7. Besides, when the oil circulates in this way, in the heat exchanger 7, heat exchange is performed between the oil and the cooling water flowing in via the heat exchanger flow path 13.

The battery cooling circuit 32 has a first battery circuit 41, a second battery circuit 42, and a radiator circuit for battery 43. The first battery circuit 41 is connected in parallel to the main circuit 11, branches from the downstream side of the heater core 38 in the main circuit 11, passes through the battery 31, and joins in a downstream side of the branching portion in the main circuit 11. In the first battery circuit 41, a second flow rate control valve 44 for adjusting the flow rate of the cooling water is arranged.

The second battery circuit 42 is connected in parallel to the heat accumulator circuit 34, and is connected to the third three-way valve 40 and passed through the battery 31, and a part at the downstream side of the second battery circuit 42 is also used as a downstream portion of the first battery circuit 41. The third three-way valve 40 is configured to selectively connect an upstream portion of the heat accumulator circuit 34 to a downstream portion of the heat accumulator circuit 34 and the second battery circuit 42.

The radiator circuit 43 is connected in parallel to the first battery circuit 41 in a manner of bypassing the battery 31. In the radiator circuit 43, a fourth three-way valve 45, a third water pump 46 that is electric, a battery radiator 47, a DC/DC converter 48 and a charger 49 are arranged in order from the upstream side. The fourth three-way valve 45 is connected to a downstream side of the charger 49 in the radiator circuit 43.

In the battery cooling circuit 32 configuring as described above, when the second flow rate control valve 44 is opened, according to the opening of the second flow rate control valve 44, the cooling water is introduced from the main circuit 11 to the first battery circuit 41 and circulates through the battery 31. Thereby, according to a temperature relationship between the cooling water and the battery 31, the battery 31 is heated or cooled by the cooling water. In addition, when the third three-way valve 40 is switched to a side of the second battery circuit 42, the high-temperature cooling water inside the heat accumulator 33 is introduced from the heat accumulator circuit 34 to the second battery circuit 42, and thereby the temperature of the battery 31 is raised.

Furthermore, if the fourth three-way valve 45 is switched to a side of the radiator 47, and the third water pump 46 is driven, the cooling water inside the battery cooling circuit 32 is sent out to the radiator circuit 43. Thereby, the heat of the cooling water is dissipated from the radiator 47 to the outside, and the DC/DC converter 48 and the charger 49 are cooled.

In addition, in the cooling and temperature raising device 1, sensors for detecting temperature states of various devices are arranged as follows. Specifically, in the engine 2, an engine water temperature sensor 51 is arranged which detects the temperature of the cooling water near the cooling water outlet of the engine 2 (hereinafter, referred to as the "engine water temperature TWE"); in the heat accumulator 33, a heat accumulator water temperature sensor 52 is arranged which detects the temperature of the cooling water near the outlet of the heat accumulator 33 (hereinafter, referred to as the "heat accumulator water temperature TWEST"); and in the battery 31, a battery temperature sensor 53 is arranged which detects the temperature of the cooling water near an outlet of the battery 31 as a battery temperature TBAT. Detection signals of these sensors are output to an ECU 10 (an electronic control unit) (see FIG. 2).

The ECU 10 is configured by a microcomputer including a CPU, a RAM, a ROM, an I/O interface (none of the parts are shown), and the like. The ECU 10 controls the cooling and temperature raising device 1 by controlling, corresponding to the detection signals and the like of the above various temperature sensors 51-53, the above various devices of the cooling and temperature raising device 1 (the first to the third water pumps 16, 36 and 46, the first and the second flow rate control valves 39 and 44, the on-off valve 17, the first-fourth three-way valves 14, 35, 40 and 45, the motor oil pump 25, the generator oil pump 26, and the like).

Figure 2:
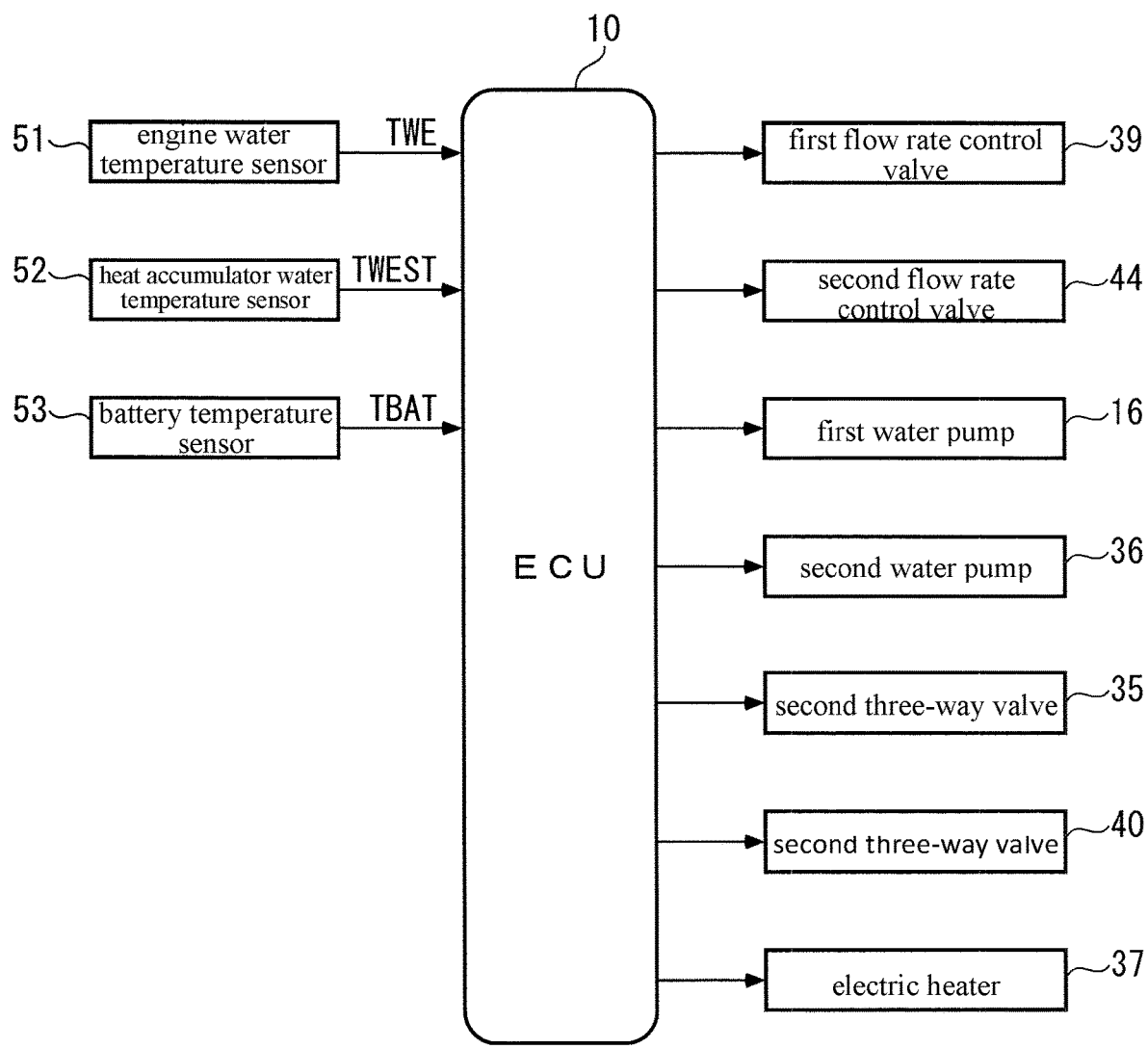
FIG. 2 is a block diagram showing a control device in the cooling and temperature raising device in FIG. 1.

In addition, the ECU 10 executes, particularly in the embodiment, a battery temperature raising control process for controlling the temperature raising of the battery 31 by controlling the devices shown in FIG. 2 and the like during the charging of the battery 31.

Figure 3:
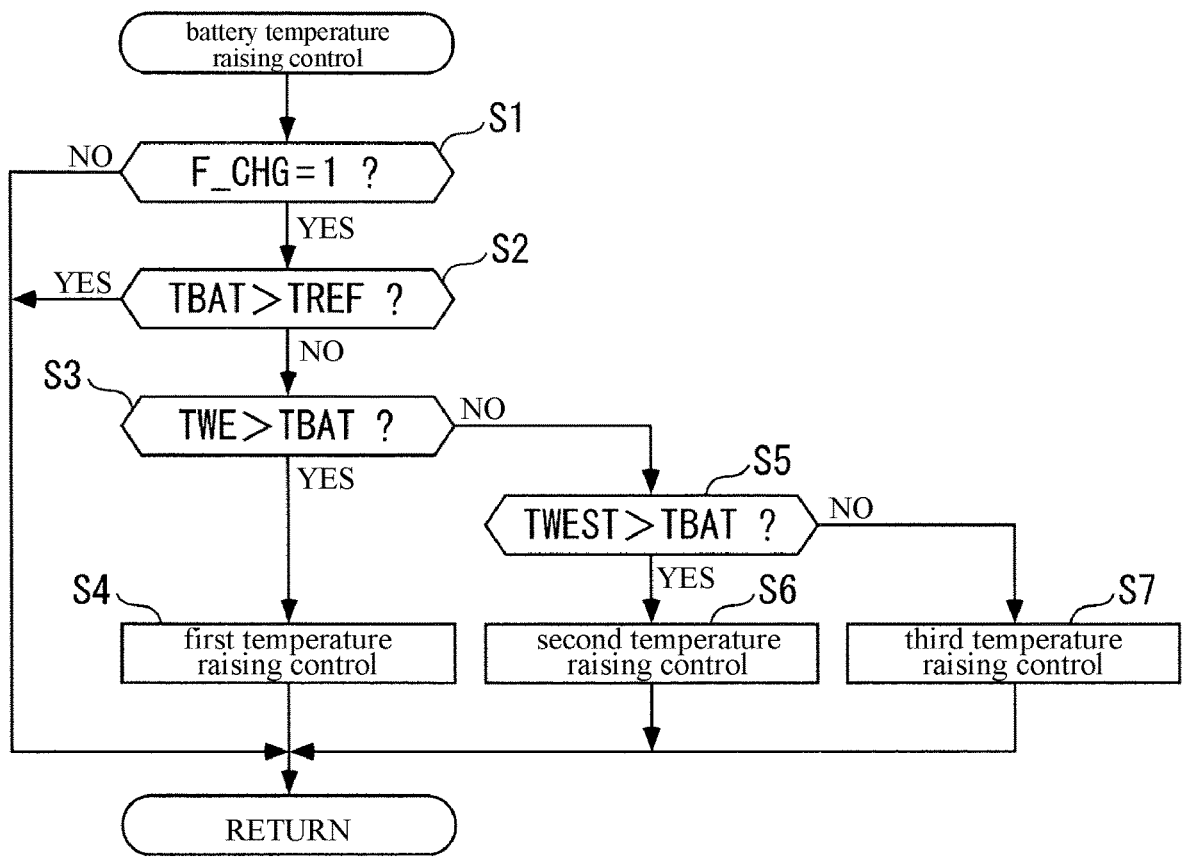
FIG. 3 is a flowchart showing a battery temperature raising control process executed by the control device in FIG. 2.

FIG. 3 shows the battery temperature raising control process. The process is repeatedly executed, for example, at a predetermined cycle. First, in step 1 of the process (illustrated as "S1", the same applies hereinafter), a determination is made on whether a battery charge flag F_CHG is "1". The battery charge flag F_CHG is set to "1" when the battery 31 is charged by an external power source at the state that the engine 2 is stopped. When an answer of step 1 is NO, and the battery 31 is not in the charging as described above, the process is ended directly.

When the answer of step 1 is YES and the battery 31 is in charging, a determination is made on whether the detected battery temperature TBAT is higher than the predetermined temperature TREF (step 2). The predetermined temperature TREF is set to a lower limit value (for example, −10° C.) of the temperature of the battery 31 at which a required charging performance of the battery 31 can be secured. When the answer is YES, the required charging performance of the battery 31 is secured and the temperature of the battery 31 is not required to be raised, and the process is ended directly.

On the other hand, when the answer of step 2 is NO and the battery temperature TBAT is equal to or less than the predetermined temperature TREF, a determination is made on whether the detected engine water temperature TWE is higher than the battery temperature TBAT (step 3). When the answer is YES and the engine water temperature TWE>the battery temperature TBAT is satisfied, as a way for raising the temperature of the battery 31 by the cooling water inside the main circuit 11, a first temperature raising control is executed in step 4, and the process is ended.

Figure 4:
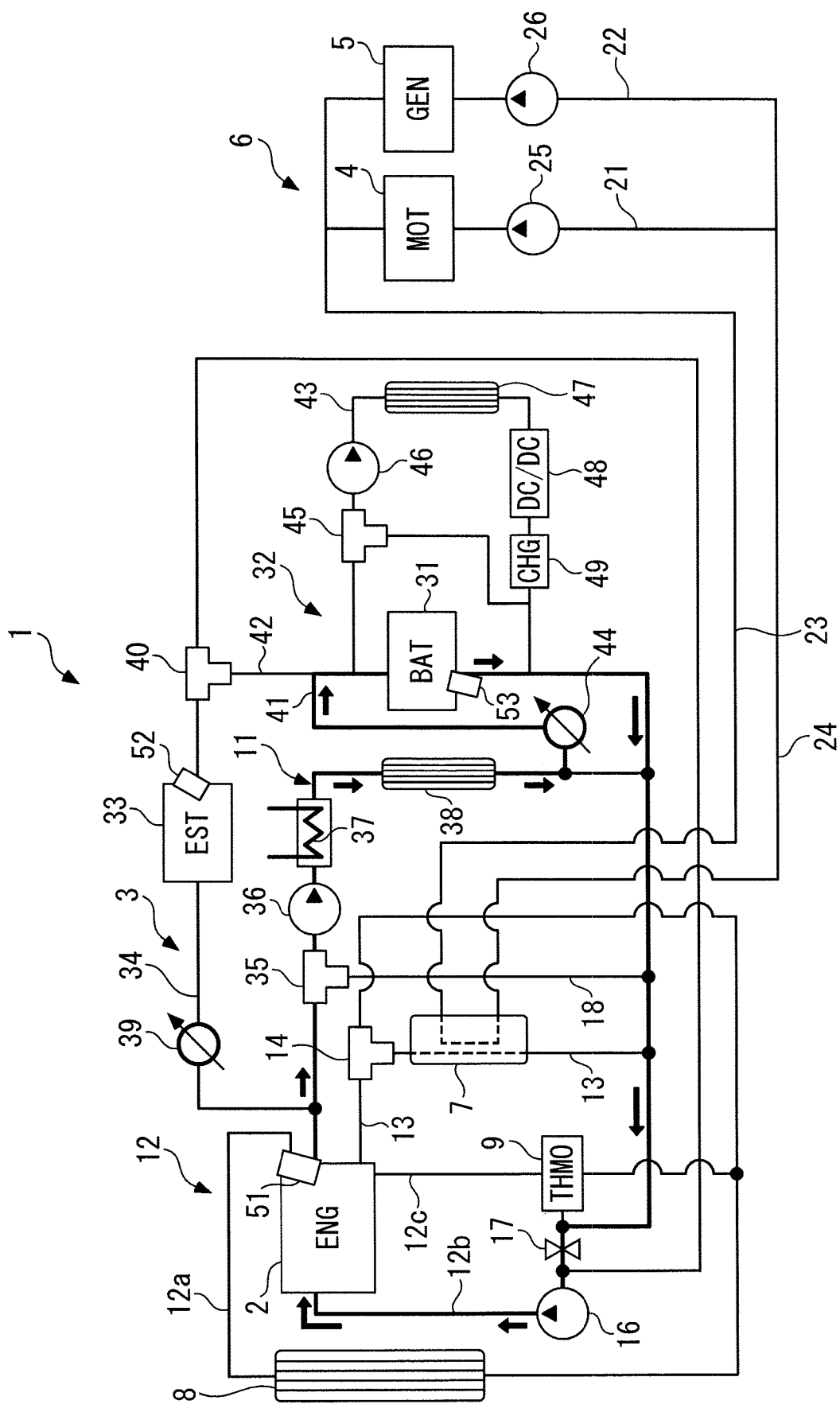
FIG. 4 is a diagram for illustrating flow of cooling water inside the cooling and temperature raising device in a first temperature raising control.

In the first temperature raising control, for example, a flow rate of the cooling water caused by the first water pump 16 (control input of the first water pump 16) is controlled to a predetermined maximum flow rate, the first flow rate control valve 39 is closed, the second flow rate control valve 44 is controlled to a maximum opening, and the second three-way valve 35 is switched to the downstream side of the main circuit 11. FIG. 4 shows flow of the cooling water obtained by the first temperature raising control. Moreover, in FIG. 4 and FIGS. 5-6 described later, flow paths through which the cooling water flows are indicated by thick lines, directions of the flow are indicated by arrows, and flow paths through which the cooling water does not flow are indicated by thin lines.

As shown in FIG. 4, according to the first temperature raising control described above, by the operation of the first water pump 16, the cooling water flowing out from the engine 2 flows through the main circuit 11, and then is introduced into the first battery circuit 41, flows out through the battery 31, and returns to the engine 2 via the main circuit 11. When the cooling water passes through the battery 31 in this way, the temperature of the battery 31 is raised by the heat exchange with the cooling water.

As described above, in the first temperature raising control, the temperature of the battery 31 in charging can be efficiently raised while utilizing the heat of the cooling water of the engine 2 without using the electric heater 37, and electric power consumption can be improved. In addition, by controlling the flow rate of the cooling water caused by the first water pump 16 to the predetermined maximum flow rate, the temperature raising of the battery 31 is promoted, and thus the battery temperature raising can be performed while the heat of the cooling water is maximally and efficiently utilized before the temperature of the cooling water decreases.

Returning to FIG. 3, when the answer of step 3 is NO, that is, when the engine water temperature TWE is originally equal to or less than the battery temperature TBAT or the engine water temperature TWE is equal to or less than the battery temperature TBAT as the above first temperature raising control is executed, a determination is made on whether the detected heat accumulator water temperature TWEST is higher than the battery temperature TBAT (step 5). When the answer is YES and the heat accumulator water temperature TWEST>the battery temperature TBAT is satisfied, as a way for raising the temperature of the battery 31 by the cooling water inside the heat accumulator 33, a second temperature raising control is executed in step 6, and the process is ended.

In the second temperature raising control, for example, the first water pump 16 is driven, the first flow rate control valve 39 is opened, the second flow rate control valve 44 is closed, and the third three-way valve 40 is switched to the side of the battery circuit 42. In addition, the flow rate of the cooling water determined by the first water pump 16 (the control input of the first water pump 16) is controlled, for example, by feedback control to make the battery temperature TBAT reach the engine water temperature TWE.

Figure 5:
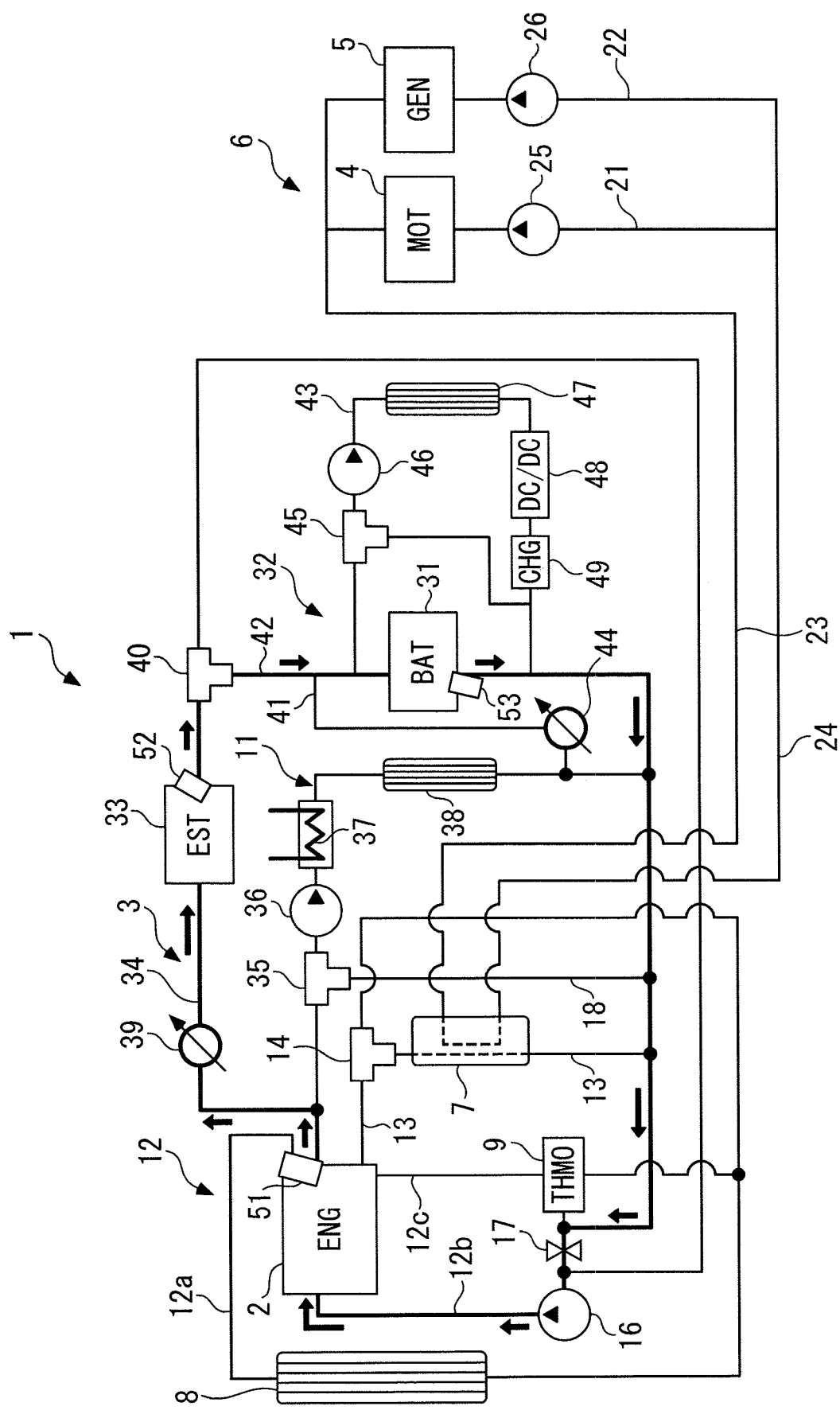
FIG. 5 is a diagram for illustrating flow of cooling water inside the cooling and temperature raising device in a second temperature raising control.
Figure 6:
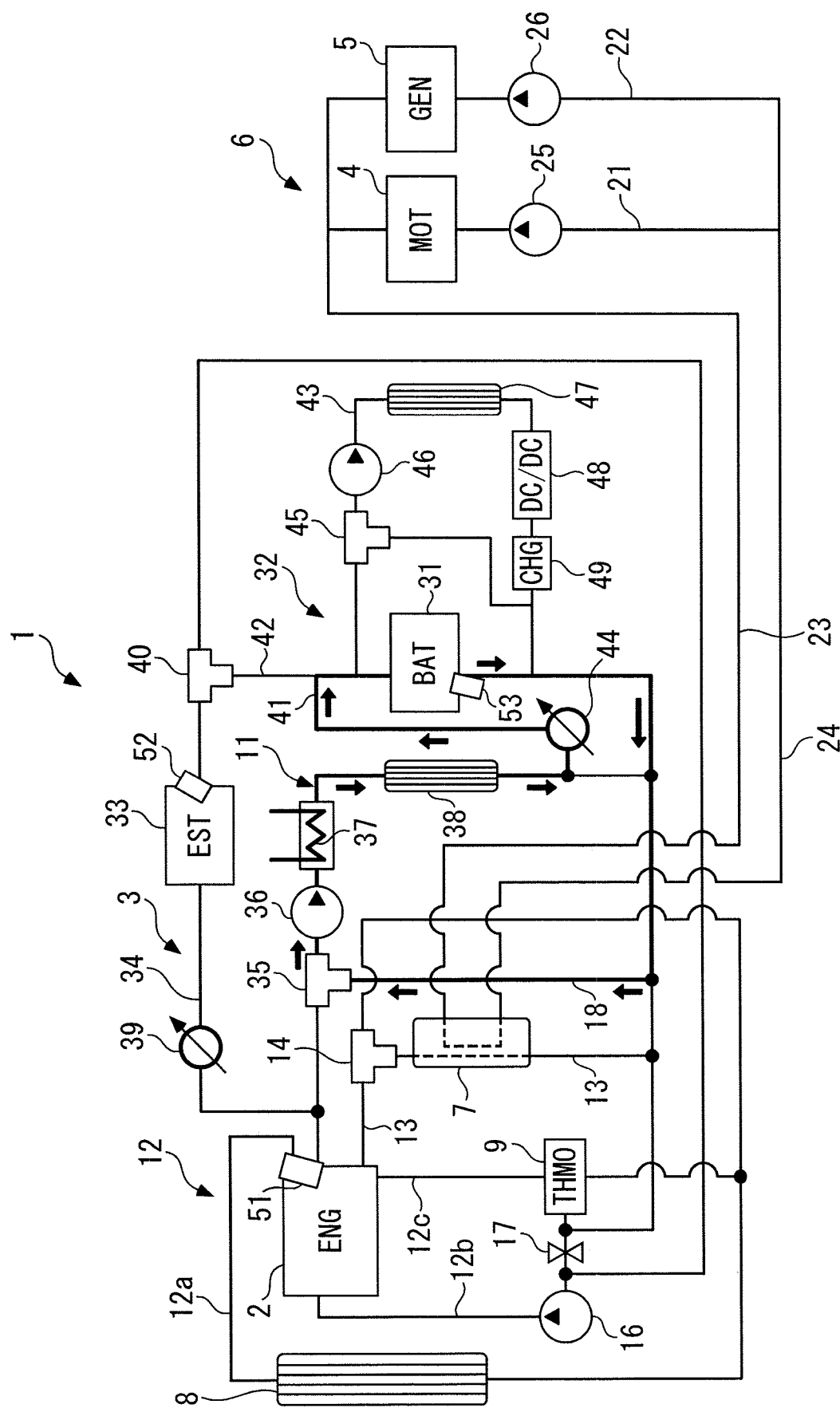
FIG. 6 is a diagram for illustrating flow of cooling water inside the cooling and temperature raising device in a third temperature raising control.

As shown in FIG. 5, according to the second temperature raising control, by the operation of the first water pump 16, the cooling water flowing out from the engine 2 flows through the heat accumulator circuit 34 and the heat accumulator 33, and then is introduced into the second battery circuit 42, flows out through the battery 31, and returns to the engine 2 via the main circuit 11. When the cooling water passes through the battery 31 in this way, the temperature of the battery 31 is raised by the heat exchange with the cooling water.

As described above, in the second temperature raising control, the temperature of the battery 31 in charging can also be efficiently raised while using the heat of the cooling water inside the heat accumulator 33 without using the electric heater 37 and the electric power consumption can be improved.

In addition, since the first temperature raising control is prioritized and then the second temperature raising control is executed, the heat of the cooling water inside the main circuit 11 can be maximally and efficiently utilized by the first temperature raising control to raise the temperature of the battery. Furthermore, when the battery temperature TBAT exceeds the predetermined temperature TREF due to the first temperature raising control and the battery temperature raising is achieved, the second temperature raising control is not executed, and thus the cooling water inside the heat accumulator which has not been used can be supplied at subsequent cold start of the internal combustion engine or the like and can be efficiently used for promoting the warm-up.

In addition, the flow rate of the cooling water caused by the first water pump 16 is controlled to make the battery temperature TBAT reach the engine water temperature TWE. Accordingly, the cooling water inside the heat accumulator 33 is not rapidly supplied to the engine 2 and the heat exchange with the cooling water in the battery 31 is sufficiently performed, and thus the heat of the cooling water inside the heat accumulator 33 is efficiently utilized and the temperature of the battery can be efficiently raised.

Returning to FIG. 3, when the answer of step 5 is NO, that is, when the heat accumulator water temperature TWEST is originally equal to or less than the battery temperature TBAT or the heat accumulator water temperature TWEST is equal to or less than the battery temperature TBAT as the above second temperature raising control is executed, the battery temperature raising has not yet been achieved, and thus as a way for raising the temperature of the battery 31 by the electric heater 37, a third temperature raising control is executed in step 7, and the process is ended.

In the third temperature raising control, for example, the electric heater 37 is actuated, the second water pump 36 is driven, the first flow rate control valve 39 is closed, the second flow rate control valve 44 is opened, and the second three-way valve 35 is switched to a side connecting the downstream portion of the main circuit 11 and the bypass flow path 18.

As shown in FIG. 5, according to the third temperature raising control, the cooling water inside the main circuit 11 is, in a state of already being heated by the electric heater 37, introduced into the first battery circuit 41 by the second water pump 36 after flowing through the main circuit 11, flows out through the battery 31, and returns to the engine 2 via the main circuit 11. When the cooling water flows through the battery 31, the temperature of the battery 31 is raised by the heat exchange with the cooling water.

As described above, in the third temperature raising control, the temperature of the battery 31 is raised by introducing the cooling water inside the main circuit 11 which is heated by the electric heater 37 into the first battery circuit 41. Accordingly, the electric heater 37 is used to reliably achieve the battery temperature raising only when the battery temperature raising is not achieved by the first temperature raising control and/or the second temperature raising control.

Moreover, the disclosure is not limited to the described embodiment and can be implemented in various aspects. For example, in the embodiment, the flow rate control valve (the second flow rate control valve 44) is used as the first switching unit for switching the connection/the block between the main circuit 11 and the first battery circuit 41, and the three-way valve (the third three-way valve 40) is used as the second switching unit for switching the connection/the block between the heat accumulator circuit 34 and the second battery circuit 42, but any form of switching unit can be employed as long as the connection/the block between two circuits can be switched.

In addition, in the embodiment, cooling water temperatures near the outlets of respective devices are detected as the temperatures representing the cooling water temperature of the engine 2 (the engine water temperature TWE), the cooling water temperature of the heat accumulator 33 (the heat accumulator water temperature TWEST), and the temperature of the battery 31 (the battery temperature TBAT), but the disclosure is not limited thereto, and cooling water temperatures inside respective devices or near the inlets of respective devices may be detected.

In addition, the configuration of the cooling and temperature raising device 1 shown in FIG. 1 and the like is merely an example, and detailed configuration of the cooling and temperature raising device 1 can be changed within the scope of the gist of the disclosure.

Other Configurations

An embodiment of the disclosure provides a battery temperature raising device which raises, in a vehicle which is equipped with an internal combustion engine 2 and a motor 4 using a chargeable battery 31 as a power source, a temperature of the battery 31 during charging the chargeable battery 31 in a state that the internal combustion engine 2 is stopped. The battery temperature raising device includes a cooling water circuit (a main circuit 11 in an embodiment (hereinafter, the same applies in this technical solution)) in which cooling water circulates through the internal combustion engine 2 due to operations of a water pump (a first water pump 16); a first battery circuit 41 which is connected in parallel to the cooling water circuit and in which the cooling water flows through the chargeable battery 31; a first switching unit (a second flow rate control valve 44) which is switched between a connection position for connecting the cooling water circuit and the first battery circuit 41 to each other and a blocking position for blocking the cooling water circuit and the first battery circuit 41; a battery temperature sensor 53 which detects a temperature (a battery temperature TBAT) of the chargeable battery 31; an engine cooling water temperature sensor (an engine water temperature sensor 51) which detects a temperature of the cooling water of the internal combustion engine 2 as an engine cooling water temperature (an engine water temperature TWE); and a temperature raising control unit (an ECU 10, steps 2-4 in FIG. 3) which executes, when the detected battery temperature TBAT is equal to or less than a predetermined temperature TREF and the detected engine cooling water temperature is higher than the battery temperature TBAT during charging the chargeable battery 31, a first temperature raising control for raising the temperature of the chargeable battery 31 by controlling the first switching unit to the connection position and introducing the cooling water inside the cooling water circuit into the first battery circuit 41.

This vehicle is equipped with the internal combustion engine and the motor which uses the chargeable battery as the power source. In addition, the battery temperature raising device of the disclosure includes the cooling water circuit in which the cooling water circulates through the internal combustion engine by the operation of the water pump, and the first battery circuit which is connected in parallel to the cooling water circuit and in which the cooling water flows through the battery, and the connection/block between the cooling water circuit and the first battery circuit is switched by the first switching unit.

According to the battery temperature raising device, the first temperature raising control is executed when the detected battery temperature is equal to or less than the predetermined temperature and the detected engine cooling water temperature (the cooling water temperature of the internal combustion engine) is higher than the battery temperature during the charging of the battery at the state that the internal combustion engine is stopped. In the first temperature raising control, the temperature of the battery is raised by controlling the first switching unit to the connection position and introducing the cooling water inside the cooling water circuit into the first battery circuit. Thereby, different from the above-described conventional device, the temperature of the battery in charging can be efficiently raised while using the heat of the cooling water of the internal combustion engine without using the electric heater, and electric power consumption can be improved.

Moreover, the above-described execution condition of the first temperature raising control that the battery temperature is equal to or less than the specified temperature and the engine cooling water temperature is higher than the battery temperature is satisfied, for example, when vehicle travel (engine travel) is performed by a motive power of the internal combustion engine until the battery is about to be charged. In addition, since the cooling water of the internal combustion engine has a large heat capacity as a whole, even when a difference between the engine cooling water temperature and the battery temperature is relatively small, the temperature of the battery can be efficiently raised.

According to an embodiment of the disclosure, in the battery temperature raising device, the temperature raising control unit controls a flow rate of the cooling water caused by the water pump to a predetermined maximum flow rate in the first temperature raising control.

In the disclosure, it is assumed that the battery is charged in the state that the internal combustion engine is stopped. Therefore, even when the condition that the engine cooling water temperature is higher than the battery temperature is satisfied at the start of the charging, thereafter, the temperature of the cooling water of the internal combustion engine is decreased as time passes by, and as a result, there is a possibility that this condition is not satisfied and the battery temperature raising utilizing the heat of the cooling water becomes impossible. Based on this point of view, according to the above configuration, in the first temperature raising control, the temperature raising of the battery is promoted by controlling the flow rate of the cooling water caused by the water pump to the predetermined maximum flow rate, and thus the battery temperature raising can be performed while maximally and efficiently utilizing the heat of the cooling water.

According to an embodiment of the disclosure, the battery temperature raising device includes a heat accumulator circuit 34 which is connected in parallel to the cooling water circuit and through which the cooling water flowing out from the internal combustion engine 2 circulates; a heat accumulator 33 which is arranged in the heat accumulator circuit 34 and accumulates heat of the cooling water by storing the cooling water; a second battery circuit 42 which is connected in parallel at a downstream side of the heat accumulator 33 in the heat accumulator circuit 34 and in which the cooling water flows through the battery 31; a second switching unit (a third three-way valve 40) which is switched between a connection position for connecting the heat accumulator circuit 34 and the second battery circuit 42 to each other and a blocking position for blocking the heat accumulator circuit 34 and the second battery circuit 42; and a heat accumulator cooling water temperature sensor (a heat accumulator water temperature sensor 52) which detects a temperature of the cooling water of the heat accumulator 33 as a heat accumulator cooling water temperature (a heat accumulator water temperature TWEST), wherein the temperature raising control unit executes, when the battery temperature TBAT is equal to or less than the predetermined temperature TREF and the detected heat accumulator cooling water temperature is higher than the battery temperature TBAT during charging the chargeable battery 31, a second temperature raising control for raising the temperature of the chargeable battery 31 by controlling the second switching unit to the connection position and introducing the cooling water inside the heat accumulator 33 into the second battery circuit 42 (steps 2, 5, 6 in FIG. 3).

According to the above configuration, the battery temperature raising device further includes: the heat accumulator circuit which is connected in parallel to the cooling water circuit and through which the cooling water flowing out from the internal combustion engine circulates; the heat accumulator which is arranged in the heat accumulator circuit and stores the cooling water to accumulate the heat of the cooling water; and the second battery circuit which is connected in parallel to the heat accumulator circuit and in which the cooling water flows through the battery; and connection/block between the heat accumulator circuit and the second battery circuit is switched by the second switching unit.

According to the above battery temperature raising device, the second temperature raising control is executed when the detected battery temperature is equal to or less than the predetermined temperature and the detected heat accumulator cooling water temperature (the cooling water temperature of the heat accumulator) is higher than the battery temperature during the charging of the battery. In the second temperature raising control, the temperature of the battery is raised by controlling the second switching unit to the connection position and introducing the cooling water inside the heat accumulator into the second battery circuit. Thereby, even in the second temperature raising control, the temperature of the battery in charging can be efficiently raised while utilizing the heat of the cooling water inside the heat accumulator without using the electric heater, and the electric power consumption can be improved.

According to an embodiment of the disclosure, in the battery temperature raising device, the temperature raising control unit executes the first temperature raising control with a priority over the second temperature raising control (steps 2-6 in FIG. 3).

As described above, in the disclosure, since the battery is charged in the state that the internal combustion engine is stopped, even when the execution condition of the first temperature raising control is satisfied at the start of the charging, the temperature of the cooling water of the internal combustion engine is decreased, and as a result, there is a possibility that the battery temperature raising by the first temperature raising control becomes impossible. On the other hand, since the temperature of the cooling water inside the heat accumulator is kept, there is no possibility that a large temperature decrease occurs during the charging of the battery.

Based on the above point of view, according to the above configuration, since the first temperature raising control is executed with priority over the second temperature raising control, the heat of the cooling water inside the cooling water circuit can be maximally and efficiently utilized by the first temperature raising control and the temperature of the battery can be raised. In addition, when the battery temperature exceeds the predetermined temperature due to the first temperature raising control and the battery temperature raising is achieved, the second temperature raising control is not executed, and thus the cooling water inside the heat accumulator which has not been used can be supplied at subsequent cold start of the internal combustion engine or the like and can be efficiently used for promoting the warm-up.

According to an embodiment of the disclosure, in the battery temperature raising device, the temperature raising control unit controls the flow rate of the cooling water caused by the water pump to make the battery temperature TBAT reach the engine cooling water temperature in the second temperature raising control.

When the first temperature raising control is executed with priority over the second temperature raising control as described above, at the end of the first temperature raising control, the engine cooling water temperature substantially coincides with the battery temperature. According to the above configuration, the second temperature raising control is started from the state in which the two temperatures substantially coincide with one another, and the flow rate of the cooling water caused by the water pump is controlled to make the battery temperature reach the engine cooling water temperature in the second temperature raising control. That is, the flow rate of the cooling water is controlled to maintain a relationship between the battery temperature and the engine cooling water temperature which coincide with one another until now. Thereby, for example, the cooling water inside the heat accumulator is not rapidly supplied to the internal combustion engine and heat exchange with the cooling water in the battery is sufficiently performed, and thus the heat of the cooling water inside the heat accumulator is efficiently utilized and the temperature of the battery can be efficiently raised.

According to an embodiment of the disclosure, the battery temperature raising device further includes an electric heater 37 which is arranged at an upstream side of a connection portion with the first battery circuit 41 in the cooling water circuit and heats the cooling water inside the cooling water circuit, wherein the temperature raising control unit executes, when the battery temperature TBAT does not exceed the predetermined temperature TREF after the execution of the first temperature raising control and/or the second temperature raising control, a third temperature raising control in which the cooling water inside the cooling water circuit which is heated by the electric heater 37 is introduced into the first battery circuit 41 by making the electric heater 37 operate and controlling the first switching unit to the connection position, and thereby the temperature of the battery 31 is raised (steps 2-7 in FIG. 3).

According to the configuration, the battery temperature raising device further includes the electric heater which is arranged at the upstream side of the connection portion with the first battery circuit in the cooling water circuit and heats the cooling water inside the cooling water circuit. According to the above battery temperature raising device, the third temperature raising control is executed when the battery temperature does not exceed the predetermined temperature after the execution of the first temperature raising control and/or the second temperature raising control. In the third temperature raising control, by actuating the electric heater and controlling the first switching unit to the connection position, the cooling water inside the cooling water circuit which is heated by the electric heater is introduced into the first battery circuit, and thereby the temperature of the battery is raised. Accordingly, the electric heater is used to reliably achieve the battery temperature raising only when the battery temperature raising is not achieved by the first temperature raising control and/or the second temperature raising control.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A battery temperature raising device which raises, in a vehicle equipped with an internal combustion engine and a motor using a chargeable battery as a power source, a temperature of the chargeable battery during charging the chargeable battery in a state that the internal combustion engine is stopped, the battery temperature raising device comprising:
   a cooling water circuit in which cooling water circulates through the internal combustion engine due to operations of a water pump;
   a first battery circuit which is connected in parallel to the cooling water circuit and in which the cooling water flows through the chargeable battery;
   a first switching unit which is switched between a connection position for connecting the cooling water circuit and the first battery circuit to each other and a blocking position for blocking the cooling water circuit and the first battery circuit;
   a battery temperature sensor which detects the temperature of the chargeable battery;
   an engine cooling water temperature sensor which detects a temperature of cooling water of the internal combustion engine as an engine cooling water temperature; and
   a temperature raising control unit which executes, when the detected battery temperature is equal to or less than a predetermined temperature and the detected engine cooling water temperature is higher than the battery temperature during charging the chargeable battery, a first temperature raising control for raising the temperature of the chargeable battery by controlling the first switching unit to the connection position and introducing the cooling water inside the cooling water circuit into the first battery circuit.

2. The battery temperature raising device according to claim 1, wherein the temperature raising control unit controls a flow rate of the cooling water caused by the water pump to a predetermined maximum flow rate in the first temperature raising control.

3. The battery temperature raising device according to claim 1, comprising:
   a heat accumulator circuit which is connected in parallel to the cooling water circuit and through which the cooling water flowing out from the internal combustion engine circulates;
   a heat accumulator which is arranged in the heat accumulator circuit and accumulates heat of the cooling water by storing the cooling water;
   a second battery circuit which is connected in parallel at a downstream side of the heat accumulator in the heat accumulator circuit and in which the cooling water flows through the chargeable battery;
   a second switching unit which is switched between a connection position for connecting the heat accumulator circuit and the second battery circuit to each other and a blocking position for blocking the heat accumulator circuit and the second battery circuit; and
   a heat accumulator cooling water temperature sensor which detects a temperature of the cooling water of the heat accumulator as a heat accumulator cooling water temperature,
   wherein the temperature raising control unit executes, when the battery temperature is equal to or less than the predetermined temperature and the detected heat accumulator cooling water temperature is higher than the battery temperature during charging the chargeable battery, a second temperature raising control for raising the temperature of the chargeable battery by controlling the second switching unit to the connection position and introducing the cooling water inside the heat accumulator into the second battery circuit.

4. The battery temperature raising device according to claim 3, wherein the temperature raising control unit executes the first temperature raising control with a priority over the second temperature raising control.

5. The battery temperature raising device according to claim 4, wherein the temperature raising control unit controls the flow rate of the cooling water caused by the water pump to make the battery temperature reach the engine cooling water temperature in the second temperature raising control.

6. The battery temperature raising device according to claim 3, further comprising an electric heater which is arranged at an upstream side of a connection portion with the first battery circuit in the cooling water circuit and heats the cooling water inside the cooling water circuit, wherein
   the temperature raising control unit executes, when the battery temperature does not exceed the predetermined temperature after executions of the first temperature raising control and/or the second temperature raising control, a third temperature raising control in which the cooling water inside the cooling water circuit which is heated by the electric heater is introduced into the first battery circuit by making the electric heater operate and controlling the first switching unit to the connection position, and thereby the temperature of the chargeable battery is raised.

7. The battery temperature raising device according to claim 4, further comprising an electric heater which is arranged at an upstream side of a connection portion with the first battery circuit in the cooling water circuit and heats the cooling water inside the cooling water circuit, wherein
   the temperature raising control unit executes, when the battery temperature does not exceed the predetermined temperature after executions of the first temperature raising control and/or the second temperature raising control, a third temperature raising control in which the cooling water inside the cooling water circuit which is heated by the electric heater is introduced into the first battery circuit by making the electric heater operate and controlling the first switching unit to the connection position, and thereby the temperature of the chargeable battery is raised.

8. The battery temperature raising device according to claim 5, further comprising an electric heater which is arranged at an upstream side of a connection portion with the first battery circuit in the cooling water circuit and heats the cooling water inside the cooling water circuit, wherein
   the temperature raising control unit executes, when the battery temperature does not exceed the predetermined temperature after executions of the first temperature raising control and/or the second temperature raising control, a third temperature raising control in which the cooling water inside the cooling water circuit which is heated by the electric heater is introduced into the first battery circuit by making the electric heater operate and controlling the first switching unit to the connection position, and thereby the temperature of the chargeable battery is raised.

* * * * *